Jan. 15, 1963   A. E. BOFFA   3,072,966
MOLD FOR THE MANUFACTURE OF FLAT FLEXIBLE ARTICLES
Filed June 27, 1960   5 Sheets-Sheet 1
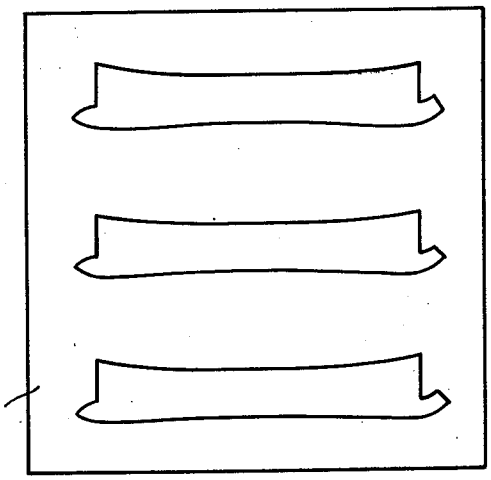
Fig.1
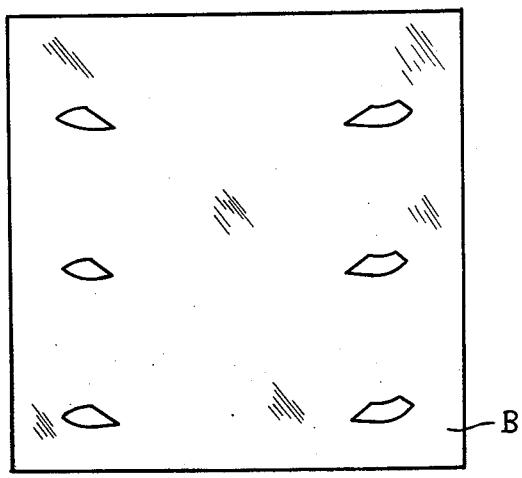
Fig. 2
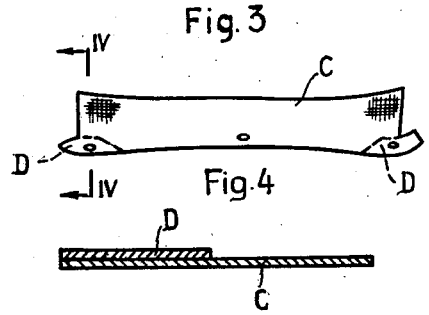
Fig. 3
Fig. 4
Inventor
Antonio Erminio Boffa
By Robert E. Burns
Attorney Jan. 15, 1963  A. E. BOFFA  3,072,966
MOLD FOR THE MANUFACTURE OF FLAT FLEXIBLE ARTICLES
Filed June 27, 1960  5 Sheets-Sheet 2
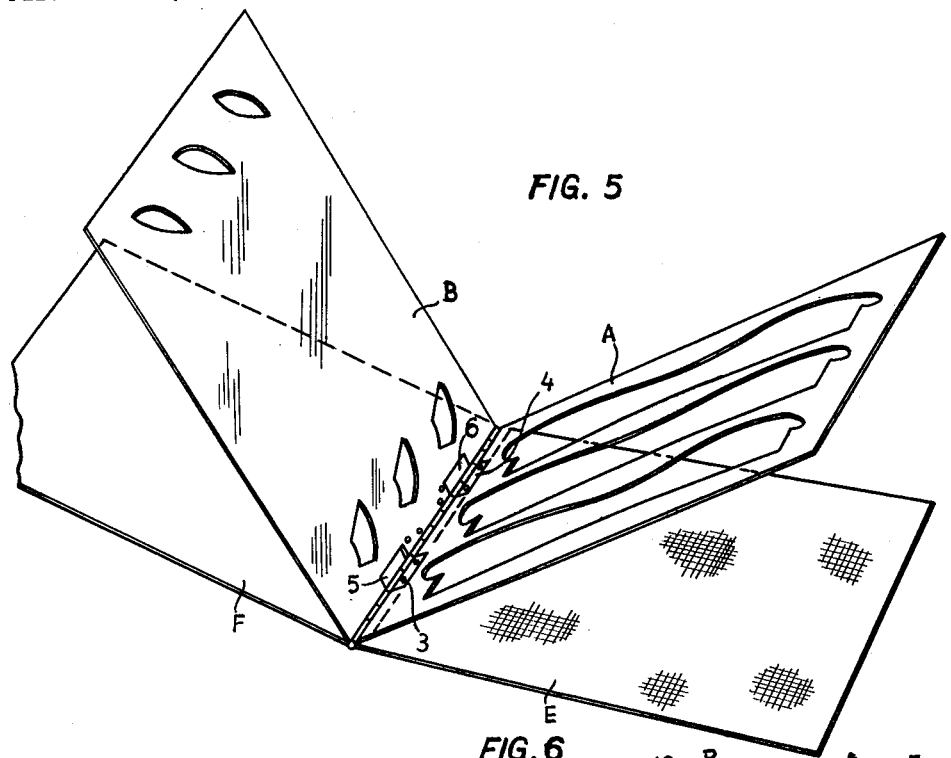
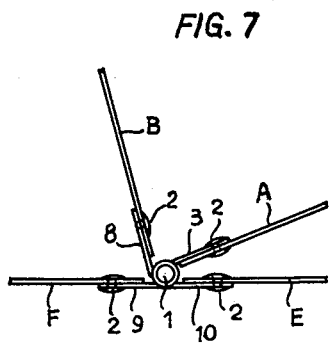
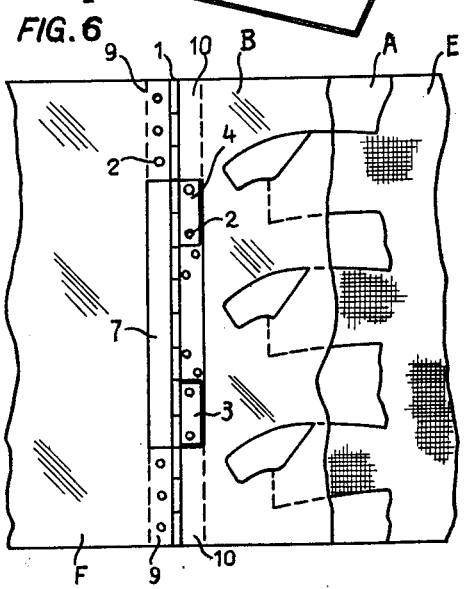
Inventor
Antonio Erminio Boffa
By Robert E Burns
Attorney

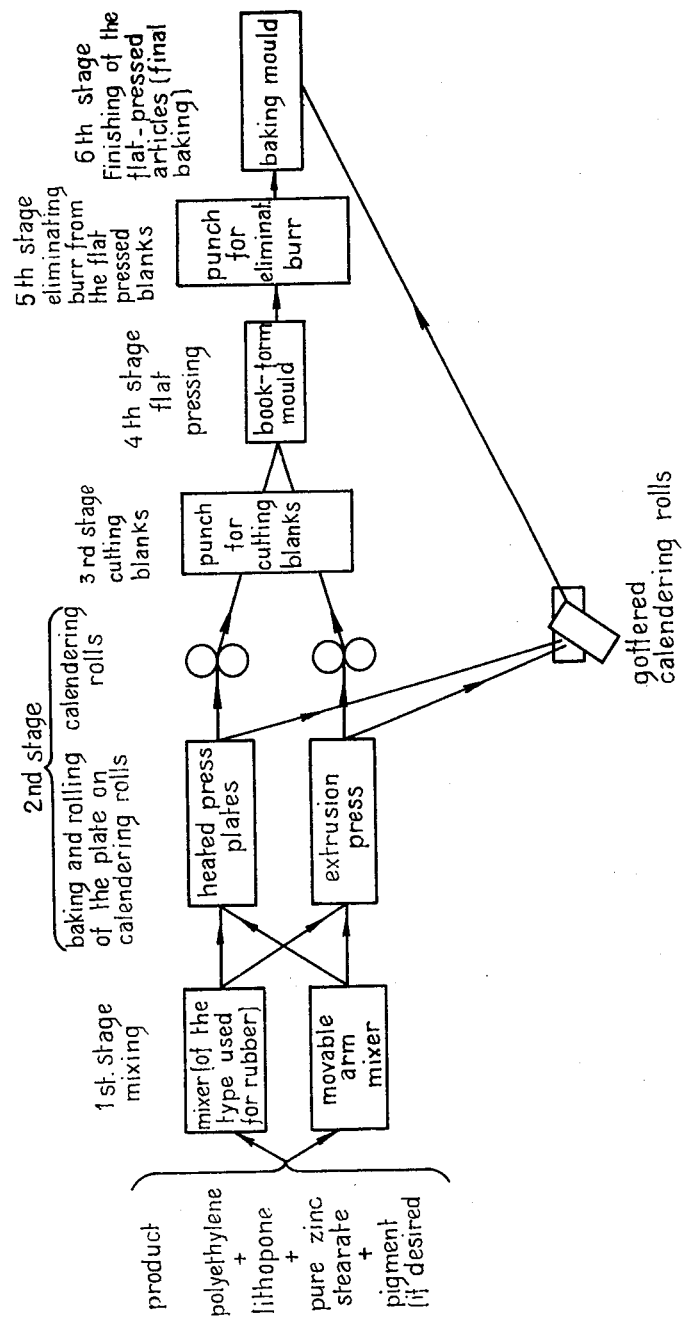

Jan. 15, 1963  A. E. BOFFA  3,072,966
MOLD FOR THE MANUFACTURE OF FLAT FLEXIBLE ARTICLES
Filed June 27, 1960  5 Sheets-Sheet 4
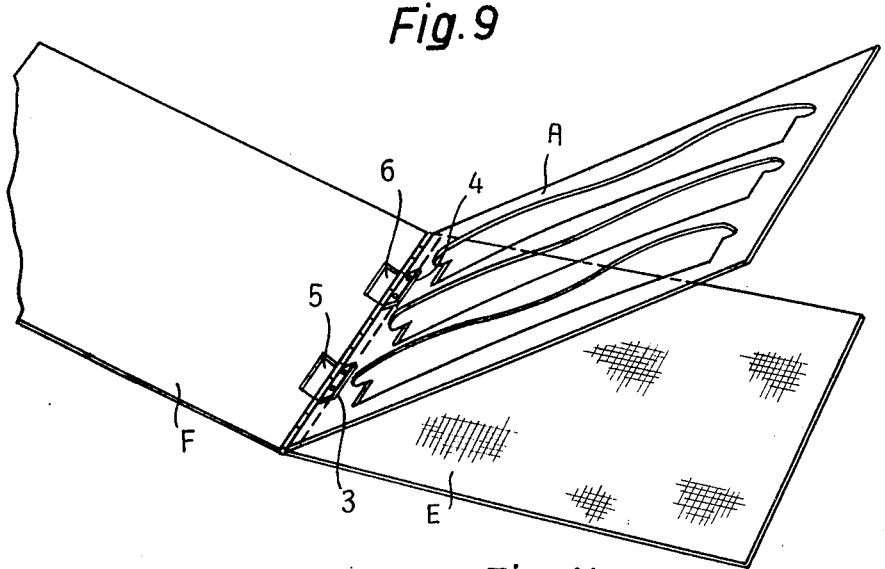
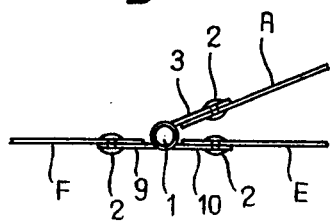
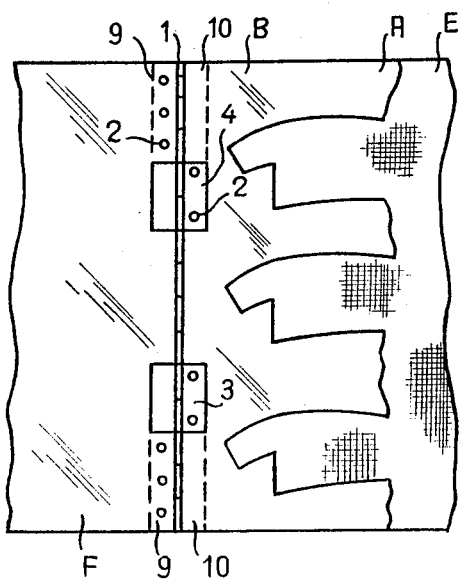
INVENTOR
ANTONIO ERMINIO BOFFA
BY
ATTORNEY United States Patent Office 3,072,966
Patented Jan. 15, 1963

1

3,072,966
MOLD FOR THE MANUFACTURE OF FLAT
FLEXIBLE ARTICLES
Antonio Erminio Boffa, 4 via Meloria, Diano Castello,
Imperia, Italy
Filed June 27, 1960, Ser. No. 39,109
Claims priority, application Italy Feb. 2, 1952
4 Claims. (Cl. 18—34)

This invention relates to a mold for the manufacture of flat, flexible articles and is more particularly concerned with a mold for the manufacture of collars, cuffs, and the like.

Molds have been previously proposed for the production of flat, flexible articles but they have been of complicated construction and have required relatively highly-skilled operators for successful operation.

It is an object of the present invention to provide a mold of the character indicated which is free from complex parts and can be easily used in a successful manner even by relatively unskilled operators.

In accordance with the invention there is provided a mold having a book-like construction and defined by a plurality of plates hingedly interconnected, including two outer cover plates and two interior plates, at least one of which is formed with cut-outs shaped to conform to the article being formed. In a preferred form of the invention, one or both of the cover plates may be textured or goffered with any desired design so that the finished article will carry the design in its surface.

The book-like mold of the present invention may be used to mold various types of moldable plastic compositions but it is particularly adapted to mold polyethylene compositions useful in the formation of cuffs, collars, and like articles and it will be described below with particular reference to its use for this purpose. Similarly, it will be described in relation to other steps and apparatus units which act upon the material being molded prior to the time it reaches the mold of the invention in the course of manufacture of the molded article. It will be understood, however, that the present invention is directed to the book-like mold per se and that it may be used with other materials and in processes involving other steps.

The composition referred to below by way of illustration comprises a polyethylene base and includes lithopone and pure zinc stearate. Best results have been obtained by the use of the following proportions:

| | Parts |
|---|---|
| Polyethylene | 100 |
| Lithopone | 12 |
| Pure zinc stearate | 4 |
| Total | 116 |

The resulting product is white and opaque and possesses all the physical and chemical properties of polyethylene.

When a colored product is desired, colored pigments or dyes are added to the mixture. Any of the dyes or pigments used in making polyethylene articles may be used, such as phthalocyanines, the dye or pigment simply being added to the lithopone.

The preferred lithopone is "red seal" lithopone. Red

2 seal lithopone consists of 68–70% by weight barium sulphate and 28–30 by weight zinc sulphide and may contain traces, e.g. 0.3–0.5% of zinc oxide but is preferably substantially free of zinc oxide. Red seal lithopone is made commercially by the well-known process of interacting barium sulphide and zinc sulphate and is sold commercially in Italy, for example, by the Montecatini Company. In Italy this product is known as "lithopone Italia sigillo rosso." The process by which it is manufactured is described, for example, in "Analisi Pigmenti Minerali" by Dr. Terenzio Vignola, Editoriale Italiana, Milan, April 20, 1947.

To form the composition, the polyethylene (100 parts) in powder form, the lithopone (12 parts) and the zinc stearate (4) parts are combined and mixed until the mixture is substantially homogeneous. Mixing is suitably effected on a roller mill of the type commonly used in the rubber industry and known as "rubber mills," or mixing may be effected in any other convenient apparatus such as a stirring apparatus of the type having arms moving in opposite directions in a mixing chamber. The apparatus parts which come into contact with the composition are suitably of stainless steel or are chrome-plated. Mixing is carried out at a temperature of about 95° C. The mixing time will, of course, vary but it has been found that the desired mixing of a 5 kilogram batch can be effected in about 30 minutes. There is thus produced the composition which consists of an intimate admixture of the above-indicated proportions of polyethylene, lithopone and zinc stearate which is readily adapted to be molded into relatively thin, flexible sheets or shaped articles.

The method of forming the intimate mixture of polyethylene, lithopone and zinc stearate into useful articles and the apparatus of the present invention, will now be described with particular reference to the accompanying drawings, wherein—

FIG. 1 is a plan view of a mold member of a mold embodying features of the present invention;

FIG. 2 is a plan view of a second mold member according to this invention;

FIG. 3 is a plan view of a finished article obtained by means of one embodiment of the apparatus according to this invention;

FIG. 4 is a sectional view taken approximately on line IV—IV of FIG. 3;

FIG. 5 is a perspective view of a complete mold employed for molding articles and embodying features of this invention;

FIG. 6 is a plan view of a portion of the mold illustrated in FIG. 5, shown on an enlarged scale;

FIG. 7 is a side view of a portion of the mold shown in FIG. 5, also on an enlarged scale;

FIG. 8 is a block diagram or flow sheet of a method of forming molded articles employing a mold according to this invention;

FIG. 9 is a perspective view, similar to that of FIG. 5, showing another embodiment of the mold of the present invention;

FIG. 10 is a side view of a portion of the mold shown in FIG. 9;

FIG. 11 is a plan view of a portion of the mold illustrated in FIG. 9, on an enlarged scale;

Figure 13:
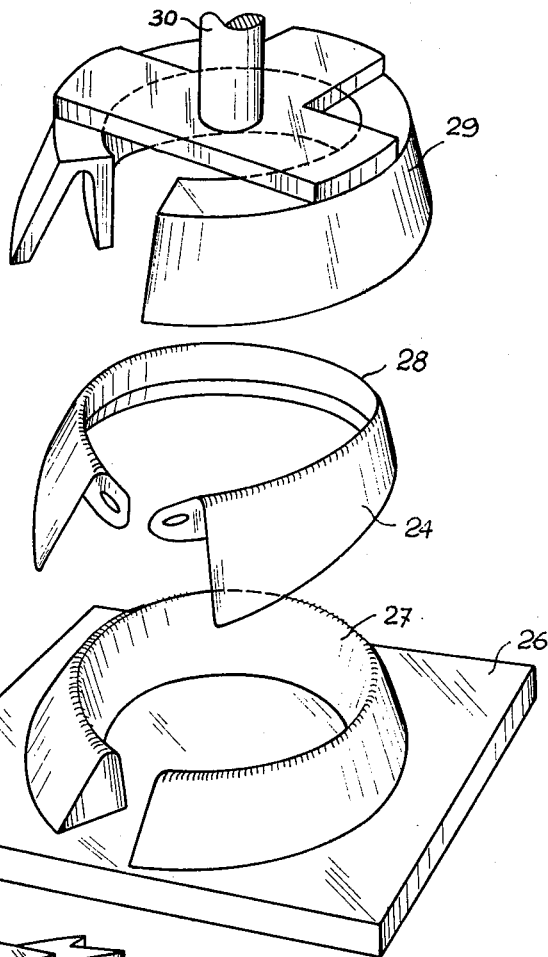
FIG. 13 is a perspective, exploded, view of the apparatus used in the final shaping of collars and in the final baking step.

Referring more particularly to FIG. 8, it will be seen that the mixed composition obtained as described above and issuing from the mixing apparatus in the first stage of the process passes to a second stage where it is heated under pressure and then passed through calender rolls to provide a sheet of any desired thickness. Thus, if it is desired to form individual sheets or plates rather than endless sheets or webs of the composition, the mixture is transferred to a press consisting of heated press plates, which are in the form of stainless steel platens, and heated under pressure at a temperature of 130–150° C. Preferably, the platens are contained in a dustless enclosure and a batch of the composition weighing 200 to 500 grams is heated for a period of 3 to 5 minutes. More particularly, a batch of the above-defined composition weighing 300 grams is heated for 4 minutes under a pressure of 17–20 kilograms per square centimeter. The resulting hot sheet is then passed between calendering rolls to smooth it and give it a desired thickness. It will be understood that the product may have any convenient thickness but it has been found that a thickness of 0.7 to 0.8 millimeter is particularly suitable for the formation of collars and cuffs. However, sheets of even less thickness, e.g. 0.28 mm., may be employed.

The platen press and the calendering apparatus are of any convenient type well known in the art, the press being suitably heated by steam under pressure, for example, and pressure being applied hydraulically, with the calendering rolls suitably being water cooled in order to cool the heated sheet as it passes between them.

When it is desired to form the composition into a continuous sheet or web, it is transferred from the mixing apparatus to a screw extrusion press of the type having an extrusion head with an enlarged flat outlet opening. The conveyor screw of the screw press is suitably heated to a temperature of about 130° C. while the extrusion head is heated to about 150° C. The extrusion head outlet is positioned close to the inlet or "nip" of the calendering rolls and the continuous extruded web passes directly between the rolls.

When a goffered sheet or web is desired, e.g. a sheet or web resembling cloth in appearance, one of the calendering rolls is goffered and the roll is immersed in water by at least one-third its diameter. The axes of the two calendering rolls are suitably displaced for this purpose by an angle of at least about 45° as indicated at the lower portion of FIG. 8. The calendered product obtained in this step is not as compact as the product issuing from the calender rolls previously mentioned, which have parallel axes and generally smooth surfaces, and this product can be used to form articles which do not require a high finish such as acid-proof cloth and aprons for industrial use.

To form collars and cuffs and like articles which must be compact and have a high finish with a smooth or finely goffered surface, the sheet or web issuing from the previously-mentioned calendering rolls with parallel axes of the second stage is passed to a blank-cutting punch in a third stage and the thus-produced blanks are then subjected to a flat pressing operation in a fourth stage which involves the use of a press employing heated platens.

In the molding operation, the molding time is about one minute and the temperature varies according to the plate thickness. After molding, the material is promptly cooled in a second press having platens cooled by forced water circulation to which the mold is transferred. Cooling is effected in about one minute. The molded articles are then subjected to the action of a second punch in a fifth stage to remove burrs from the flat-pressed blanks. Finally, the molded articles are shaped and baked in a sixth and finishing stage.

In accordance with the present invention, there are provided book-like molds particularly adapted for carrying out the aforementioned fourth-stage molding and pressing step. The molds of the present invention are very easy to manipulate, fill and discharge and they permit a high output. An illustrative embodiment of the book-like mold of the invention is shown in FIGS. 1, 2, 5, 6 and 7. The mold illustrated is adapted to form shirt collars and this mold, which is best seen in perspective in FIG. 5, comprises the following elements:

(1) A stainless steel plate E, having a thickness up to 0.8 millimeter. This plate may be smooth, or if goffered articles are to be formed, it is provided with a flat photo-etching corresponding to the desired pattern, such as imitation cloth, piquet with rows of stitches, and the like. This plate forms the mold bottom.

(2) Two German silver plates A and B, superposed successively on plate E, and cut out to suit the shape of the article to be molded. The plate A is of the same thickness as the article to be manufactured developed in a plane, the plate B is of the same thickness as the desired reinforcement and is cut out only in the regions in which the article is to be provided with reinforcements. The thickness of the plates ranges between 0.25 and 1.0 millimeter.

(3) A plate F of chrome-plated German silver having a thickness of up to 0.8 millimeter, forming a cover for the two plates A and B.

All of the above-mentioned plates are hinged together by means of chrome-plated hinges, so that the mold opens like a book. As seen in FIGS. 5, 6 and 7, the hinges are articulated to a common hinge pin 1, each of them being connected to one end of its respective plate by means of rivets 2. In order to permit the plates to approach each other closely when the mold is closed, the hinges are staggered along the book-like mold and peripheral slits or cut-outs are provided in adjacent plates and suitably positioned to receive and accommodate the hinge thickness. For example, hinges 3 and 4 secured to the plate A fit in the cut-outs 5 and 6 (FIGURE 5) formed in the plate B when the book-like mold is closed. The plate F has a long central cut-out 7 in order to accommodate the thickness of the central hinge 8 secured to the plate B (FIG. 6).

The pairs of hinges 9, 10, are respectively secured externally to the plates F, E, and do not, therefore, require any special provision to accommodate their thickness. The hinges advantageously substantially equal the plates in thickness, e.g. 0.8 mm.

Articles produced in the above-described molds are highly compact and can be utilized for making articles of wear, packing glands, gaskets, and the like. The cut-outs formed in one or both of plates A and B are selected and shaped in accordance with the nature of the article being produced. It will be understood that the cut-outs in the form of a collar to produce a reinforced collar are given by way of specific embodiment only and they may be replaced by cut-outs of any other desired shape and/or size.

FIGS. 3–4 illustrate a collar C obtained by the mold of FIGS. 5–7, the reinforcement D formed by the cut-outs in plate B being shown.

In FIGS. 9, 10 and 11 is shown an embodiment of the mold of the invention in which the plate C is omitted and in which non-reinforced collars are effectively formed. In this embodiment, the plates A, E and F are identical with plates A, E and F of the embodiment of FIGS. 5–7 except that there is no necessity for the cut-out 7 to accommodate the hinge of plate B.

Figure 12:
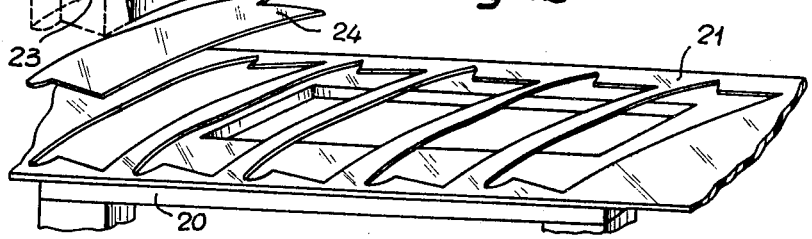
FIG. 12 is a perspective view showing, somewhat diagrammatically, apparatus suitable for cutting the blanks to be pressed in the mold of the invention.

The third-stage cutting operation is carried out by using German silver molds comprising male and female elements, machined to the desired shape, or it is effected by means of the punch shown in FIG. 12. As seen in FIG.

12, a supporting table 20 receives the polyethylene sheet 21 to be cut and molded, and the sheet is moved from left to right under the punch 22 which has a cutting edge 23 in the shape of the desired article, e.g. a collar, which cooperates with the surface of table 20 to cut the desired blanks 24. The cutting edge of the punch is, of course, shaped to produce the article desired and a similar but differently-shaped cutting edge is used to produce the reinforcements D when a collar such as shown in FIG. 3 is to be produced, as in the mold of FIGS. 5–7. The punch is actuated by any convenient means, as by the piston 25 of a hydraulic cylinder (not shown).

The thus-punched blanks are then introduced into the book-like mold previously described, and the molding operation is carried out. After molding, any burrs which may have been formed are removed in any convenient manner, e.g. with a punch such as shown in FIG. 12. The molded article is then ready for final shaping and baking. In FIG. 13 is shown a press and mold which is employed to shape the blanks into collars. The device shown in FIG. 13 includes a plate or bed 26 carrying a lower mold part or projection 27 upon which the blank, which has previously been bent slightly along the line 28 is received, and an upper mold part 29 which mates with the part 27 to shape the blank 24 between them into the form shown in the center of FIG. 23. As in the case of the punch 22 shown in FIG. 12, the upper mold half 29 is actuated in any convenient manner, as by the piston 30 of a hydraulic cylinder (not shown). Alternatively, the upper mold part may be actuated manually and the rod 30 may serve as a handle for this purpose. The two mold halves are clamped together by any convenient means such as a vise, C-clamps, or the like.

The two mold halves between which the flat molded article is thus placed and molded are held in clamped relationship while the article in the mold is baked in an oven at a temperature not exceeding 100° C. for a period not exceeding 15 minutes. The mold is then cooled in an air or water bath, and the finished article removed.

It will be understood that various changes and modification may be made in the invention as above-described and illustrated and it is intended, therefore, that all matter contained in the foregoing description and in the drawing shall be interpreted as illustrative only and not as limitative of the invention.

This application is a continuation-in-part of my copending application, Serial No. 326,749 filed December 18, 1952 and now abandoned.

What I claim and desire to secure by Letters Patent is:

1. A book-like mold for molding at least one collar provided with reinforcements, using a moldable plastic polyethylene composition, comprising a stainless steel bottom plate having a thickness up to 0.8 millimeter and having on its surface facing the interior of the mold a flat photo-etching corresponding to the pattern desired in the collar, a first German silver plate and a second German silver plate superposed successively on said bottom plate, said first plate being substantially of the same thickness as the collar to be formed developed in plane and being formed with at least one aperture corresponding in shape to the shape of said collar developed in plane, and said second plate being substantially of the same thickness as the reinforcements for the collar and being formed with at least one aperture positioned in at least a partial overlying relationship with an aperture in said first plate and corresponding in shape to a reinforcement for the collar, and a chrome plate German silver cover plate having a thickness up to 0.8 millimeter, all of said plates being hinged together.

2. A book-like mold for molding at least one collar provided with reinforcements using a moldable plastic polyethylene composition comprising a bottom plate, a first plate and a second plate superposed successively on said bottom plate, said first plate being substantially of the same thickness as the collar to be formed developed in plane and being formed with at least one aperture corresponding in shape to the shape of said collar developed in plane, and said second plate being substantially of the same thickness as the reinforcements for the collar and being formed with at least one aperture positioned in at least a partial overlying relationship with an aperture in said first plate and corresponding in shape to a reinforcement for the collar, a cover plate, and means for hinging all of said plates together so that the mold will open and close like a book, said means comprising a common hinge pin arranged adjacent one edge of the book-like mold and a plurality of hinge elements articulated to said hinge pin and each secured to one of said plates of the mold, said hinge elements being staggered along the book-like mold edge adjacent the hinge pin and the plates of the mold being provided with cut outs at their edges adjacent said hinge pin suitably positioned and shaped to receive and accommodate the hinge elements secured to the adjacent plates of the mold, thereby permitting said plates to approach each other closely when the mold is closed.

3. A book-like mold for molding at least one collar provided with reinforcements, using a moldable plastic polyethylene composition, comprising a stainless steel bottom plate having a thickness up to 0.8 millimeter and having on its surface facing the interior of the mold a flat photo-etching corresponding to the pattern desired in the collar, a first plate and a second plate superposed successively on said bottom plate, said first plate being substantially of the same thickness as the collar to be formed developed in plane and being formed with at least one aperture corresponding in shape to the shape of said collar developed in plane, and said second plate being substantially of the same thickness as the reinforcements for the collar and being formed with at least one aperture positioned in at least a partial overlying relationship with an aperture in said first plate and corresponding in shape to a reinforcement for the collar, a cover plate having a thickness up to 0.8 millimeter and means for hinging all of said plates together so that the mold will open and close like a book, said means comprising a common hinge pin arranged adjacent one edge of the book-like mold and a plurality of hinge elements articulated to said hinge pin and each secured to one of said plates of the mold, said hinge elements being staggered along the book-like mold edge adjacent the hinge pin, and the plates of the mold being provided with cut outs at their edges adjacent said hinge pin positioned and shaped to receive and accommodate the hinge elements secured to the adjacent plates of the mold, thereby permitting said plates to approach each other closely when the mold is closed.

4. A book-like mold for molding at least one collar provided with reinforcements, using a moldable plastic polyethylene composition, comprising a stainless steel bottom plate having a thickness up to 0.8 millimeter and having on its surface facing the interior of the mold a flat photo-etching corresponding to the pattern desired in the collar, a first German silver plate and a second German silver plate superposed successively on said bottom plate, said first plate being substantially of the same thickness as the collar to be formed developed in plane and being formed with at least one aperture corresponding in shape to the shape of said collar developed in plane, and said second plate being substantially of the same thickness as the reinforcements for the collar and being formed with at least one aperture positioned in at least a partial overlying relationship with an aperture in said first plate and corresponding in shape to a reinforcement for the collar, a chrome-plated German silver cover plate having a thickness up to 0.8 millimeter and means for hinging all of said plates together so that the mold will open and close like a book, said means comprising a common hinge pin arranged adjacent one edge of the book-like mold and a plurality of hinge elements articulated to said hinge pin and each secured to one of said plates of the mold, said hinge elements being staggered along the book-like mold edge adjacent the hinge pin, and the plates of the mold being provided with cut outs at their edges adjacent said hinge pin positioned and shaped to receive and accommodate the hinge elements secured to the adjacent plates of the mold, thereby permitting said plates to approach each other closely when the mold is closed.

References Cited in the file of this patent

UNITED STATES PATENTS

| | | |
|---|---|---|
| 808,473 | Osborne | Dec. 26, 1905 |
| 972,173 | Erdbrugger | Oct. 11, 1910 |
| 1,177,833 | Tufford | Apr. 4, 1916 |
| 1,451,510 | Holmes | Apr. 10, 1923 |
| 1,775,812 | Church | Sept. 16, 1930 |